(12) United States Patent
Kariv

(10) Patent No.: US 8,276,844 B2
(45) Date of Patent: Oct. 2, 2012

(54) UNMANNED AERIAL VEHICLE LAUNCHING AND LANDING SYSTEM

(75) Inventor: Amnon Kariv, Ra'anana (IL)

(73) Assignee: Elbit Systems Ltd., Rehovot (IL)

( * ) Notice: Subject to any disclaimer, the term of this patent is extended or adjusted under 35 U.S.C. 154(b) by 508 days.

(21) Appl. No.: 12/364,206

(22) Filed: Feb. 2, 2009

(65) Prior Publication Data

US 2009/0224097 A1 Sep. 10, 2009

Related U.S. Application Data

(63) Continuation of application No. PCT/IL2007/000488, filed on Apr. 18, 2007.

(30) Foreign Application Priority Data

Jul. 31, 2006 (IL) .......................................... 177185

(51) Int. Cl.
  *B64F 1/02* (2006.01)
(52) U.S. Cl. .............. 244/110 C; 244/100 E; 244/110 R
(58) Field of Classification Search .............. 244/110 A, 244/110 C, 110 E, 110 F, 110 G, 110 R, 63; 124/17
  See application file for complete search history.

(56) References Cited

U.S. PATENT DOCUMENTS

| | | | |
|---|---|---|---|
| 1,383,595 A | | 7/1921 | Black |
| 2,286,381 A | * | 6/1942 | Rubissow ........................ 244/63 |
| 3,980,259 A | * | 9/1976 | Greenhalgh et al. .......... 244/139 |
| 4,311,290 A | | 1/1982 | Koper |
| 4,753,400 A | | 6/1988 | Reuter |
| 4,790,497 A | * | 12/1988 | Yoffe ............................. 244/115 |
| 5,109,788 A | * | 5/1992 | Heinzmann .................... 114/261 |
| 6,874,729 B1 | * | 4/2005 | McDonnell ..................... 244/63 |
| 2005/0230536 A1 | | 10/2005 | Dennis | |

FOREIGN PATENT DOCUMENTS

| | | |
|---|---|---|
| DE | 3206299 B1 | 9/1982 |
| DE | 4301671 B1 | 7/1993 |
| EP | 1602576 B1 | 4/2011 |
| GB | 2231011 B1 | 11/1990 |

OTHER PUBLICATIONS

Dickard, H. E. "Mini-RPV Recovery System Conceptual Study" pp. 107-109. Aug. 1977.*
Phillips, K. "Alternate Aquila Recovery System Demonstration Recovery System Flight Tests" pp. 3-6. Jan. 19, 1977.*
International Search Report and written opinion of PCT/IL2007/000488 dated Sep. 20, 2007 (14 pages).

* cited by examiner

*Primary Examiner* — Tien Dinh
*Assistant Examiner* — Michael Kreiner
(74) *Attorney, Agent, or Firm* — Rodney J. Fuller; Booth Udall, PLC

(57) ABSTRACT

The invention relates to a system for landing UAV's. The system comprises a slingshot structure that includes arm based structure and an axis installed along the arm of the structure and enabling the arm to move around it. The system comprises a base connecting the axis to a platform at which the system is installable. The system also includes a controlled pulling and braking means that connects the arm of the structure and the platform upon which the system is installable and stretchable elastic installed in a stretched manner at a gap formed between two arms and set to connect with a landing UAV. At the landing phase, the controlled pulling and braking of the system essentially breaks the motion of the arm based structure that is propelled to revolve around the system's axis, and propels the structure to move around the axis.

3 Claims, 15 Drawing Sheets

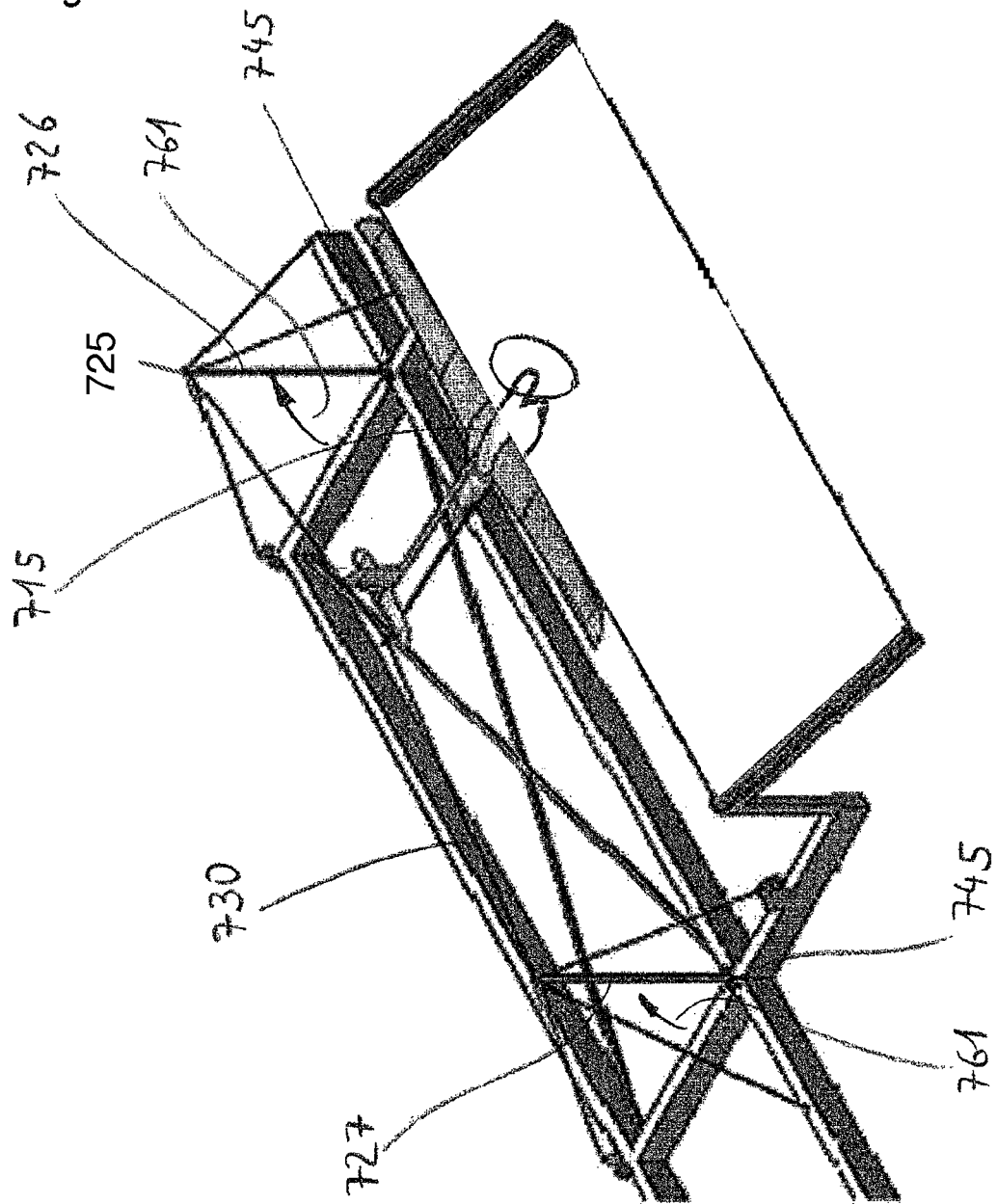

UNMANNED AERIAL VEHICLE LAUNCHING AND LANDING SYSTEM

RELATED APPLICATION DATA

Figure 1:
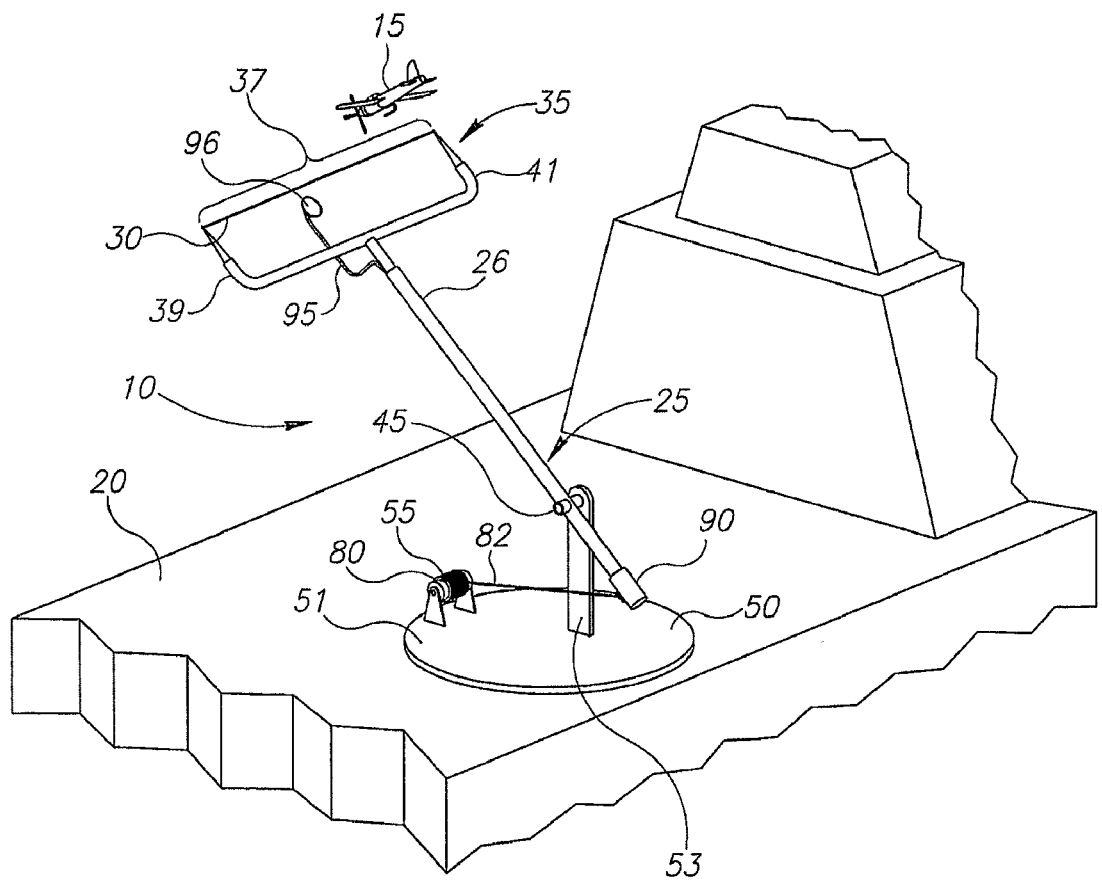

This application is a continuation-in-part of International Application No. PCT/IL2007/000488 filed on Apr. 18, 2007, which claims the benefit of priority from Israeli Application No. 177185 filed on Jul. 31, 2006, the content of each of which is expressly incorporated herein in its entirety by this reference.

FIELD OF THE INVENTION

The present invention relates to the field of systems for launching and landing aircrafts in general, and specifically to systems for launching Unmanned Aerial Vehicles (herein after UAV) from a mobile or stationary platform wherein this platform has relatively small dimensions (for example, a vessel, a truck, a fenced area) and landing them on it at the completion of their flight.

BACKGROUND OF THE INVENTION

In the course of the recent years, the scope of utilizing UAV's grew and expanded noticeably, particularly for military tasks. As a rule, the constraints imposed on UAV's usage stems from the requirement of employing a rather long runway for their "take off's" (i.e., launching) and landings.

At the same time, a need for a new operational approach has developed, calling for long stay in the air of one or more UAV flying over a given geographical sector of interest, for example—in order to locate a target at that defined sector and guiding an armament toward the target. Other examples are such as—utilizing the UAV as a decoy or for a tactical reconnaissance mission.

This is an operational need, whose derivative is a requirement to launch UAV's at a high rate and safely retrieving them, in a manner enabling their recurring use. Moreover, the assimilation of UAV's services leads to the requirement that operating them would not only be possible from orderly, large area landing strips, as said, but also from over mobile platforms endowed with relatively small dimensions. For example, from the decks of missiles' boats, frigates and corvettes, wherein using the UAV is the equivalent of elevating their masts (tall mast substitute) provides surveillance beyond the horizon, so that a UAV launched over a vessel gives observation capability to a range of 50 to 100 miles.

In addition, urban arenas wherein armed conflicts are currently taking place, leads to the requirement that operating UAV's' would be available from a ground confined urban space and not just from an orderly, large area landing strips.

Diverse systems and methods were offered in the past in order to impart launching and landing capability of UAV's from mobile platforms, such as vessels, as stated above.

A U.S. Pat. No. 3,980,259—Aircraft Recovery Methods, describes a system for landing an RPV (remotely piloted vehicle) on a mobile platform (for example, a vessel) by using a hovering parachute that is spread over the airborne vehicle and a cable that is let down from the RPV and is subsequently tied to the platform; the cable serves to pull the RPV unto the platform (in a similar mode as retrieving a kite).

A "shipboard air vehicle retrieval apparatus" is described in U.S. Pat. No. 4,753,400. The device described in this patent is based on a parachute with lift force and a net parachute that is linked to it, and they both are connected to the vessel with a cable. The lift-up parachute stabilizes the net parachute wherein it is tied by the cable to the vessel. The unmanned vehicle is led to the net parachute and after its collision with the net parachute and being made to land there, the cable is pooled and rolled back into the vessel.

U.S. Pat. No. 4,790,497 describes a "point landing method for non vertical takeoff and landing flying objects". This method is based on tying up—during the flight, a cable from the flying vehicle to an anchoring means, and subsequently pulling the vehicle in flight to the designated touchdown point—using a winch in the course of continuous flight of the vehicle.

U.S. Pat. No. 5,109,788 describes an "apparatus for recovery of an unmanned, reusable aircraft". The subject matter of this patent is a trampoline-like device that is opened and spread unto the outside of the mobile platform (for example, the wall of a vessel) in order to land the aerial vehicle on the vessel.

U.S. Pat. No. 6,874,729 describes a "Launch and recovery system for unmanned aerial vehicle". The system launches the aerial vehicle by hoisting it aloft using a hovering parachute, and dropping it from there—from the hovering parachute that is tied to the mobile platform (for example, a vessel). In a preferred configuration of the system that is described in the patent, the system even retrieves the aerial vehicle and lands it into a net that is spread aloft (at a pre-set height) using a system comprising a cable and the hovering parachute.

Patent application EP 1602576 describes an "Unmanned aerial vehicle deceleration system" that is based on damping the UAV landing through propelling of a braking device into which the UAV collides (for example, a net-like device), in the direction of the UAV's flight and from the force of the collision (of the UAV unto the net), until the UAV is stopped. The major part of the kinetic energy is absorbed during the process due to the aerodynamic drag that is generated by the mobile braking device.

All the above cited systems and methods do not impart a suitable solution to the challenge presented by the tactical requirement of high rate launching and landing of an UAV from and upon a mobile platform whose dimensions are relatively small (for example, a vessel) as stated, which is really the challenge presented by the cited operational requirements.

Verily, the launching of a UAV might be aided by a pyrotechnic device (such as an accelerating rocket) that exhausts and is cast off away from the UAV after its launching, but even more than the environmental danger generated by such a device and its relatively high costs, we are still left with the problem of retrieving the aerial vehicle.

Landing a UAV by tying the aerial vehicle to a cable that is dropped off from the UAV, sending aloft hovering parachutes from the platform or setting up net means on the platform, as were described in the above cited patents documents, do not yet provide an adequate solution. The implementation of solutions as presented mandates to employ operating teams endowed by high expertise and specialized capabilities, combined with an increase of the mobile platform's dimensional and "signature"—rendering to higher danger of being detected combined with the potential interference—up to shutting off—with the operation of arms and surveillance equipment on board the platform (due to the deployment of cables, parachutes and the like in close vicinity on board the platform).

Thus, at the period preceding this current invention, there existed the long felt and continuous need for a compact landing and launching UAV's system that would be distinguished by its small dimensions, installable on a relatively small mobile platform (for example, a missiles boat) while being integrated with the armament and detection systems aboard these platforms on the one hand but without causing interference to their battle operational modes and equipment, culminating in a launching and landing system that is easy to maintain and operate and that would impart UAV's launching and landing capability at a high rate and with remarkable reliability and safety features.

SUMMARY OF THE PRESENT INVENTION

The present invention, at its most basic core configuration, enables to land a UAV by a highly compact landing device that provides a marked saving of the required area (thus installable on relatively small mobile platforms).

In a preferred configuration of this present invention it constitutes a dual use system—the same system, with only minor changes that can be performed at the launching site, serves both for launching the UAV and for landing it.

A system in accordance with the invention is characterized by comprising a mechanical slingshot structure. An axis means is installed along the central arm of the structure and enables the central arm movement around it. A base means of the system couples the axis means to the platform on which the system is positioned (for example, a vessel, a vehicle, train or a post). Means for controlled pulling and braking connects the bottom end of the central arm of the structure to the system's base means.

At the time that a system in accordance with such preferred embodiment of the invention is activated in its UAV launching mode, a dismountable carriage means is installed on the upper end of the central arm of the structure. Unto this carriage means—the UAV designated to be launched is connected in a manner so that it can be severed later.

At the launching phase, the means for controlled pulling and braking pulls the central arm of the structure and propels the structure to turn around the system's axis means in a manner such that the carriage means imparts a velocity to the UAV that is coupled to it, in a direction that is tangential to the rotational movement of the structure and of such a value (i.e., magnitude) that it enables severing the UAV from the carriage means and it takes off to the air.

At the time that a system in accordance with such preferred embodiment of the invention is activated in its UAV landing mode, there is installed on the upper end of the central arm of the structure in a manner that is dismountable, an assembly that is essentially formed in the shape of the letter Y, and an elastic stretchable and energy absorbing means that is installed so that it is stretched in the opening between the two slanted arms of the Y-shaped assembly, and is suited to connect unto the UAV that is landing towards it.

At the landing stage, the controlled pulling and braking means essentially brakes the motion of the central arm of the structure that is propelled, as said, to rotate around the system's axis means, from the time that the UAV approaching to land forms contact with the elastic means that is stretched in the opening between the slanted arms of the Y-shaped assembly and propels with it the structure and the assembly to rotate around the axis means of the system.

BRIEF DESCRIPTION OF THE ACCOMPANYING DRAWINGS

The present invention will be described hereinafter in conjunction with the accompanying figures. Identical components, wherein some of them are presented in the same figure—or in case that a same component appears in several figures, will carry an identical number.

FIG. 1 constitutes an illustration view of system for launching and landing UAV's in accordance with a preferred embodiment of the present invention, wherein in the illustrated example it is actuated for landing a UAV and wherein in the illustrated example the system is positioned at the stern of a mobile platform of the missile boat type.

Figure 2:
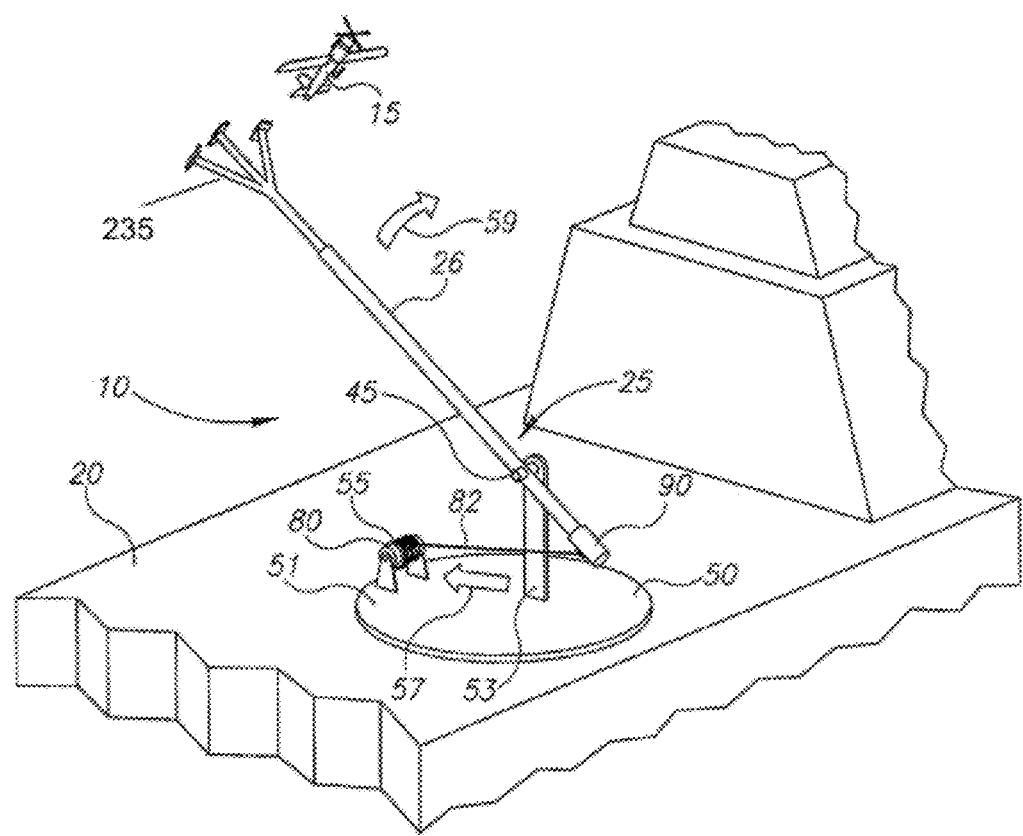

FIG. 2 constitutes an illustration view of a system for launching and landing UAV's that is illustrated in FIG. 1, wherein—in the illustrated example it is actuated for launching a UAV.

Figure 3:
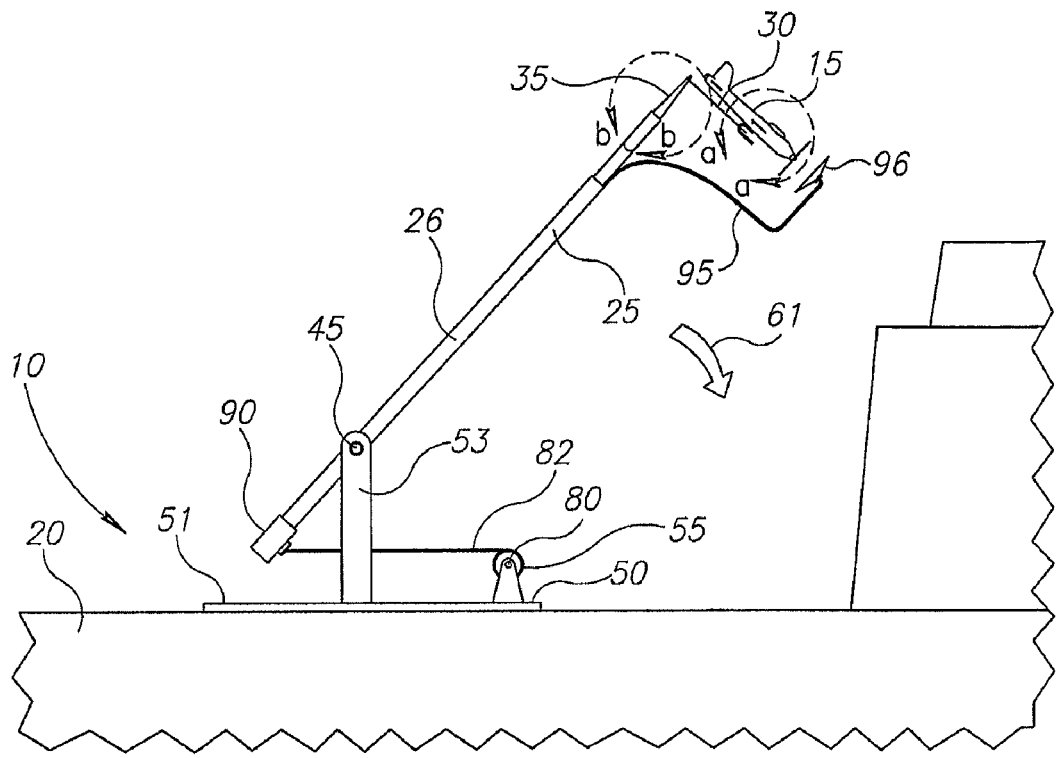

FIG. 3 constitutes a side view of the system for launching and landing UAV's that is illustrated in FIG. 1, wherein it is shown in the course of landing a UAV.

Figure 4:
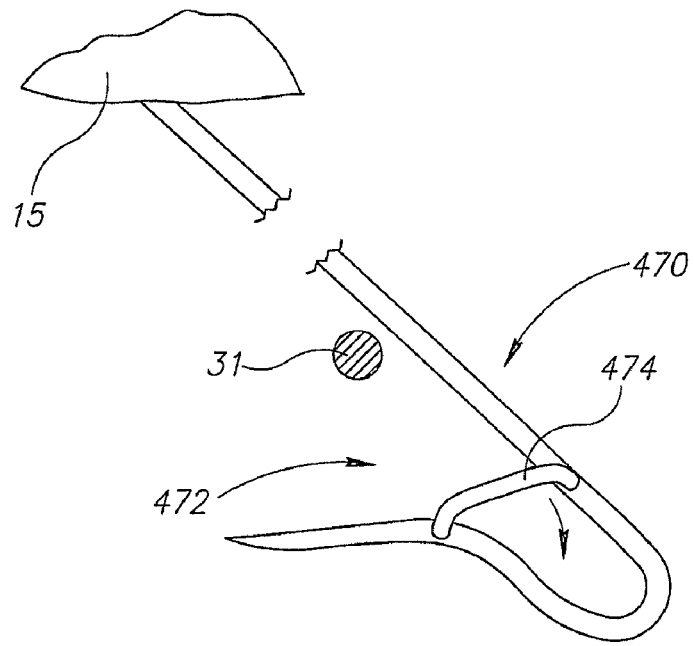

FIG. 4 constitutes an enlarged view of the a-a area depicted in FIG. 3, in a manner that shows the hook means that serves to catch the UAV in its landing stage unto the cable of the system.

Figure 5:
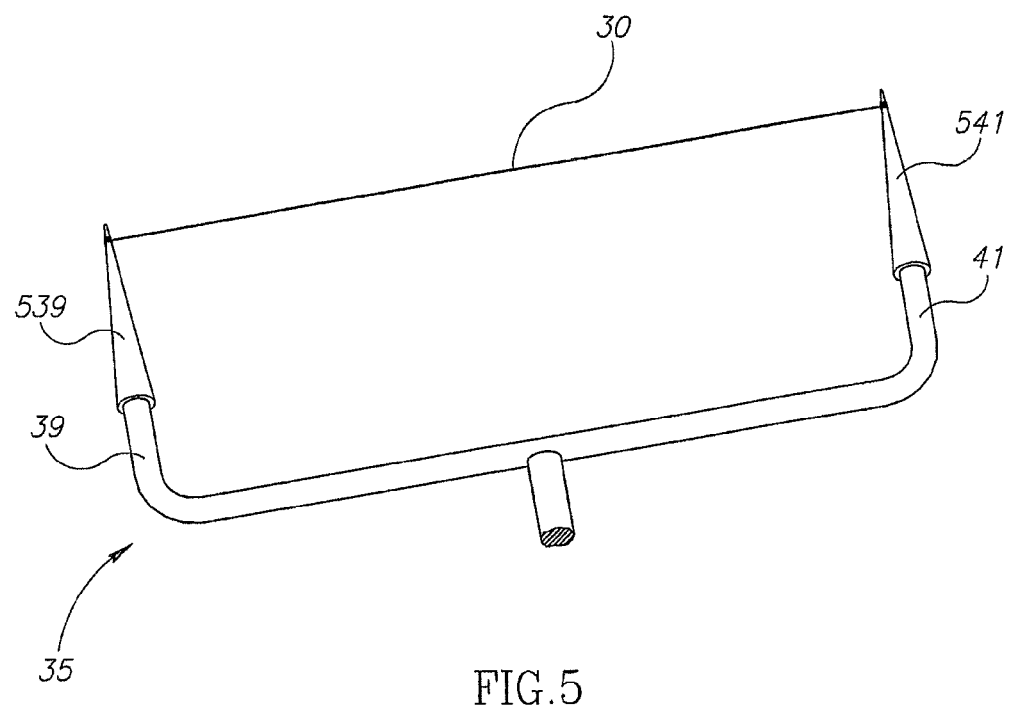

FIG. 5 constitutes an enlarged view in perspective representation of the b-b area depicted in FIG. 3, in a manner that shows a sector of the ends of the elastics entities of an assembly that is installed in the system when it is deployed for landing a UAV.

FIG. No. 6 constitutes an illustration view of an additional configuration of a system for launching and landing UAV's in accordance with the present invention, wherein the system is shown in its state for stowing (as it is folded).

FIGS. 7a to 7g constitute an operational sequence of yet an additional configuration of a system for landing (only) of UAV's in accordance with the present invention, wherein the system is deployable across a platform deck.

Figure 8A:
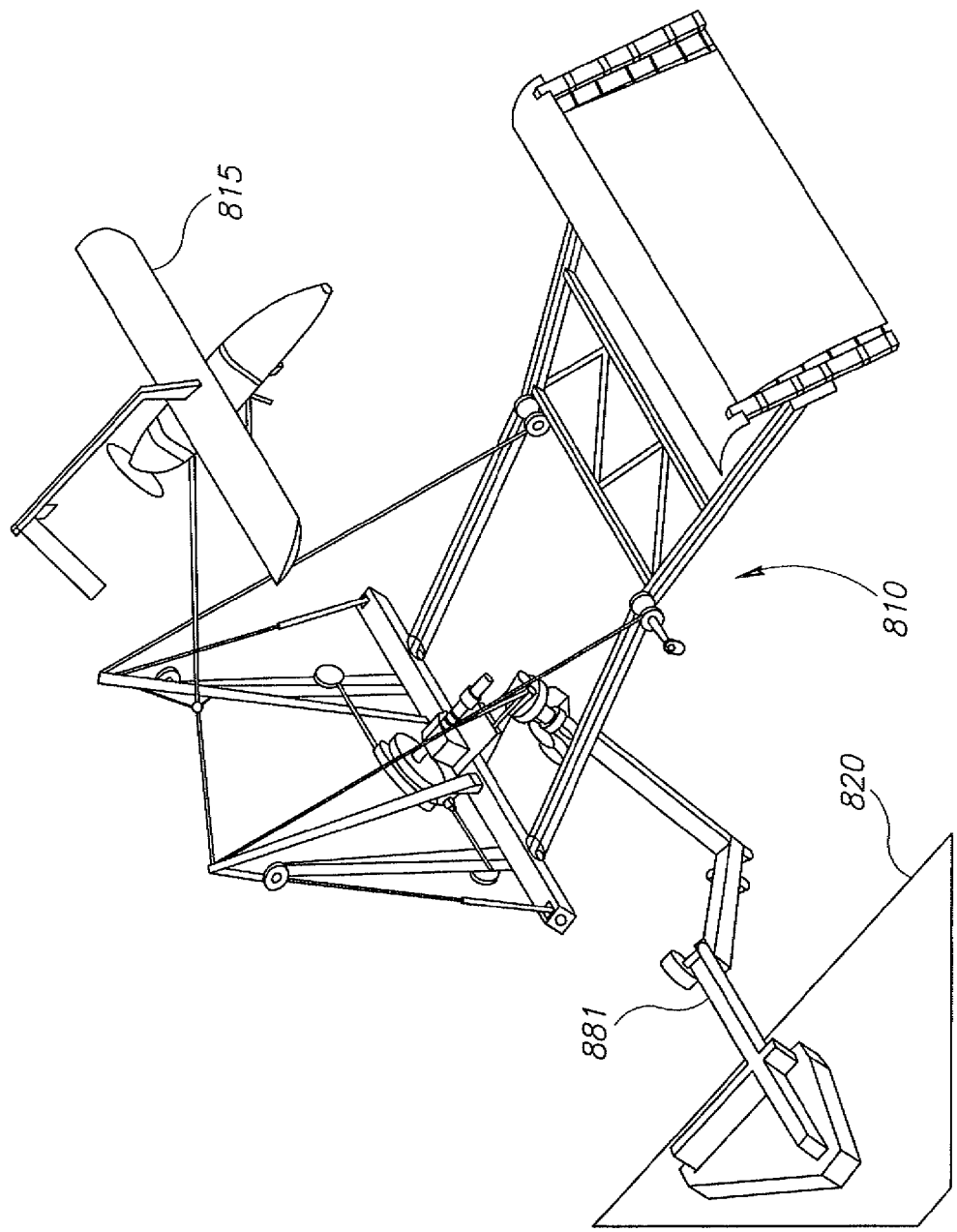
Figure 8B:
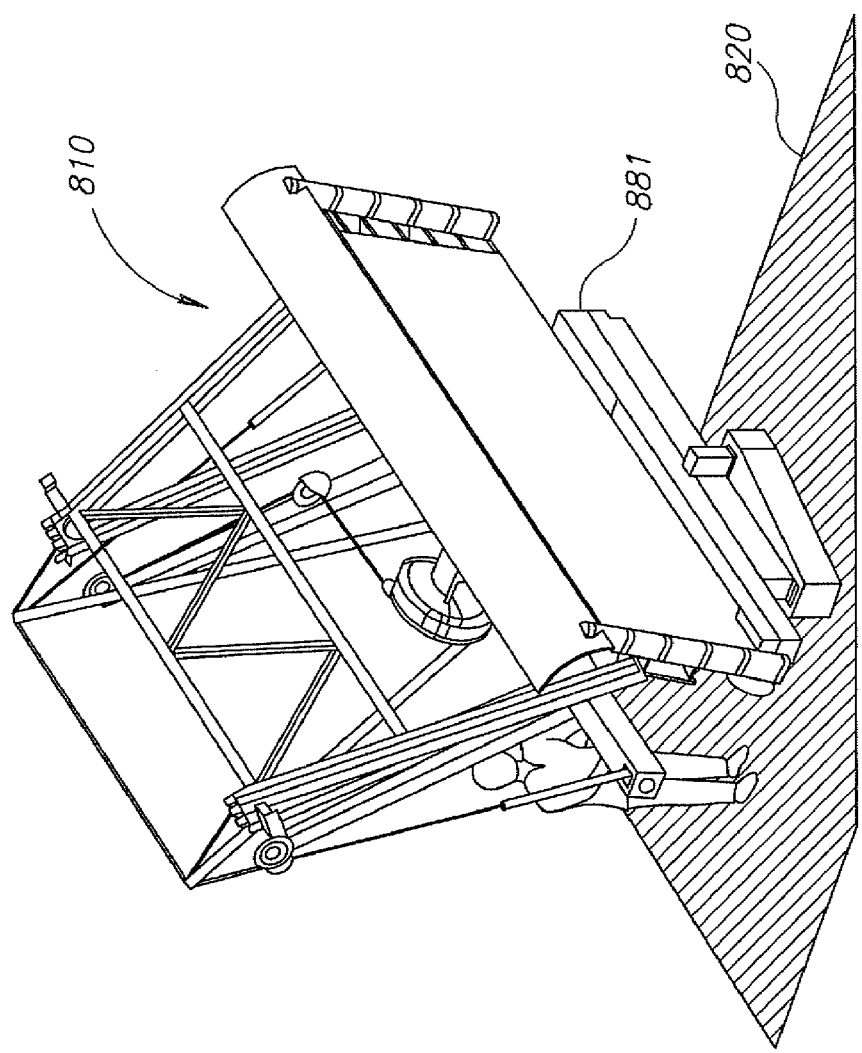

FIGS. 8a and 8b constitute illustrations of yet an additional configuration of a system for landing (only) of UAV's in accordance with the present invention, wherein the system is depicted in its deployable position across the platform's deck (FIG. 8a) and folded for stowage position (FIG. 8b).

Figure 9A:
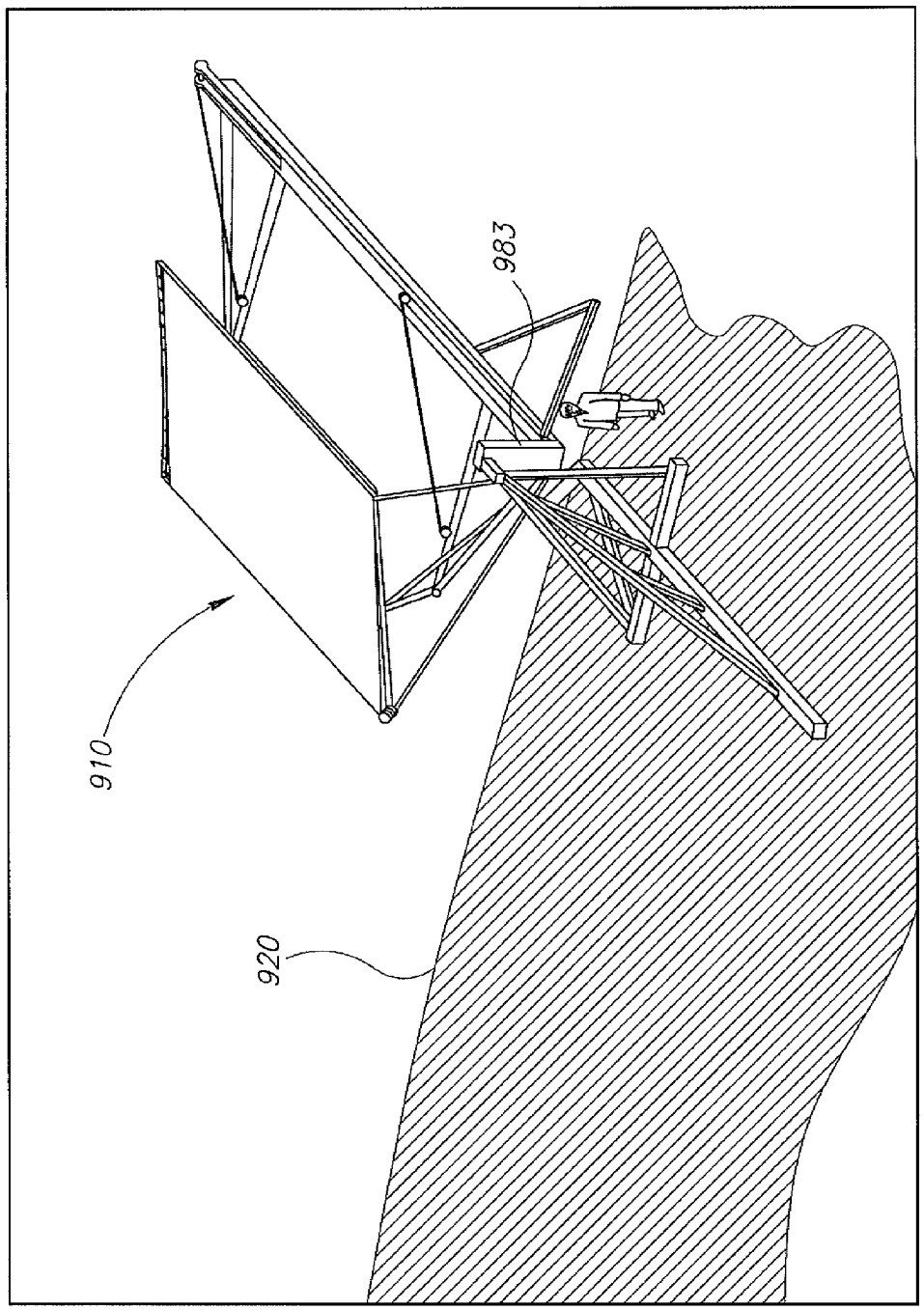
Figure 9B:
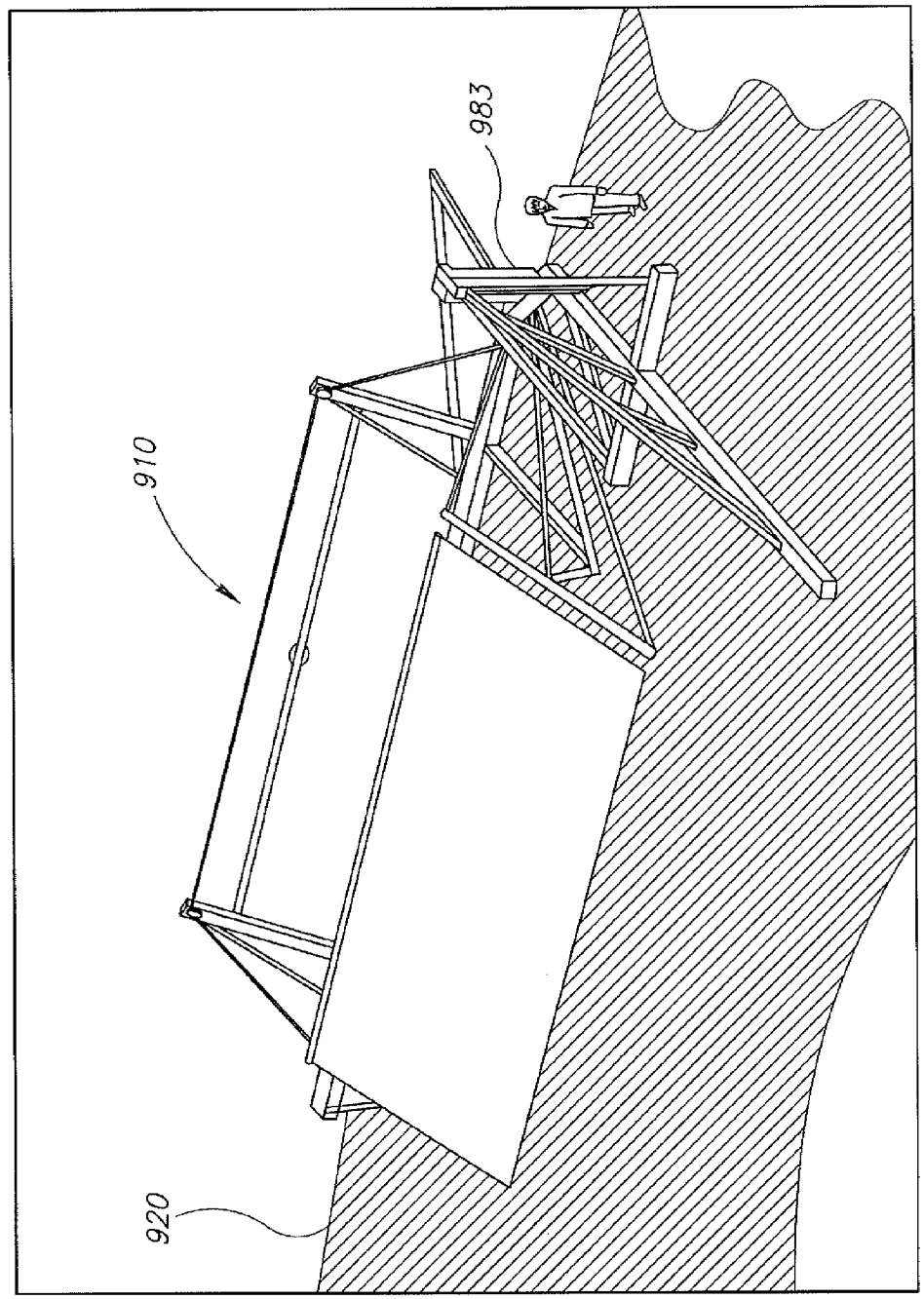

FIGS. 9a and 9b constitute illustrations of yet an additional configuration of a system for landing (only) of UAV's in accordance with the present invention, wherein the system is depicted in its deployable position across the platform's deck (FIG. 9a) and folded for stowage position (FIG. 9b).

DETAILED DESCRIPTION OF PREFERRED EMBODIMENT OF THE INVENTION

Let's refer to FIG. 1. FIG. 1 constitutes an illustration view of system 10 in accordance with a preferred embodiment of the present invention, the embodiment wherein the same system, with only minor changes that can be performed at the launching site, serves both for launching a UAV 15 and for landing it.

In the illustrated example, system 10 is mounted at the stern of a mobile platform that in this example is a missile boat 20, but any professional in this field would understand that a system in accordance with the invention might also be mounted on a myriad of other types and differing mobile (or also static) platforms, such as a vessel, a vehicle, a train or a post.

A system in accordance with the invention comprises a structure 25 that constitutes a sort of a mechanical slingshot structure.

A landing case of UAV 15 is illustrated in FIG. 1. In this case, assembly 35 is added in a dismountable manner to the central arm 26 of structure 25. The configuration of assembly 35 is generally (substantially) of a Y shaped item.

In this mode and as said wherein structure 25 is operable as a kind of a mechanical slingshot, the structure is characterized by elastic means 30 which is connected to the add-on Y shaped assembly 35. Elastic means 30 constitutes a stretchable means that is installed so that it is stretched bridging the gap 37 between the slanted arms 39 and 41 of assembly 35.

As it would be explained later on (when referring to FIGS. 3 and 4), elastic means 30 is adapted for connecting unto UAV 15 in the course of its landing.

System 10 comprises, in addition to all the above, also an axis means 45 that is installed along the central arm 26 of structure 25 and enables the arm movement around it.

Base means 50 connects axis means 45 to the platform at which system 10 is installed. In the illustrated example, the system is installed on the stern of missiles boat 20, but—as said, any professional in this field would understand that the system might as well be installed on other and different platforms (for example, a vessel, a vehicle, train or a (surveillance) post).

Means 55 for controlled pulling and braking connects between the lower end of central arm 26 of structure 25, to base means 50.

System 10 might be operated to function in two operational modes, namely launching mode and landing mode.

Naturally, any expert in this field would understand that system 10 might be operated either in its landing mode or, alternatively, in its launching mode. For example, system 10 might be operated solely for executing the landing operations, whereas the launching is performed using an auxiliary means such as a rocket or any other selected means.

When operating in the launching mode (see below when referring to FIG. 2)—the mechanical slingshot 25 serves to "hurl" the UAV or at least driving it close to the speed that is required for its free independent flight.

When in the landing mode (see FIG. 1 and herein under when referring to FIGS. 3 and 4), the same mechanical slingshot structure in accordance with the present invention, receives the UAV, brakes it and damps its landing.

Any professional in this field would appreciate the fact that in accordance with this preferred embodiment of the present invention, the one and same system, with only minor changes in terms of switching between the end assemblies (on the central arm) that serve for launching or landing (respectively), i.e., they are those that execute the UAV's launching and landing operation. From this, obviously, the advantages of simplicity, compactness and space saving (economy of space) derive.

Reference is being made to FIG. 2 and FIG. 3.

FIG. 2 constitutes a perspective view of a system 10 for launching and landing a UAV that is illustrated in FIG. 1, shown at the time of launching UAV 15.

Prior to actuating the system in the launching mode, carriage means 235 is installed in a dismountable manner at the upper end of central arm 26. UAV 15, the UAV designated to be launched, is connected to the carriage means.

As can be seen in the figure, at the time that system 10 is operating in its launching mode, means 55—the controlled pulling and braking means, pulls the central arm 26 of structure 25 (in the direction of the arrow numbered 57) and propels the structure to rotate around axis means 45 (in the direction of the arrow numbered 59).

Through this arrangement, carriage means 25 imparts a velocity to UAV 15 that is, as said, connected to it so that it can be severed from it. This velocity, in a tangential direction to the rotational movement of structure 25, is at a magnitude that enables disconnecting the UAV from carriage means 235, and at least helps it in soaring (i.e., taking off) to the sky.

Any professional experienced in this field would understand that in addition, or alternatively, it is possible to impart taking off velocity to the UAV by using other means, such as pyrotechnic means (that are not illustrated).

It is to be stressed that subject to the specific data of the UAV being used (i.e., weight, required take off speed, etc.) it is possible to achieve hurling of the UAV to the air by solely using system 10, and bringing the specific UAV to sufficient velocity in order to take off and fly independently and with no need to use additional means.

Let's refer now to FIG. 3. FIG. 3 constitutes a side view of system 10 for launching and landing UAV's that is illustrated in FIGS. 1 and 2, wherein it is shown—similarly to FIG. 1—in the course of landing UAV 15.

As can be seen in this figure, at the time that system 10 is operating in the landing mode, means 55 brakes the movement of central arm 26 of structure 25. Arm 26 is propelled to rotational movement around axis means 45, from the instant that UAV 15 (the one that is to land) connects with elastic means 30. This contact drives structure 25 to its rotational movement, as said, around axis means 45 (in the direction of the arrow numbered 61).

Any experienced professional would understand that the landing mode operation of system 10 is based, inter alia, on braking and damping the movement of structure 25, from the time, as said, that UAV 15 connects with elastic means 30. This connection drives structure 25—as said, to rotational movement around axis means 45 (in the direction of the arrow numbered 61)

Thus, a system in accordance with the invention might include in addition a braking and damping means (that is not illustrated) that is integrative with axis means 45 in such a manner that when at the landing mode—this means brakes and damps the movement of structure 25 around the axis means 45. Such a braking and damping means might be based, for example, on a viscous damper.

In the configuration of system 10, as in accordance with the illustrated in FIGS. 1 to 3, a controlled pulling and braking means 55 that is connected between the lower end of the central arm 26 of structure 25 and axis means 50, includes a propelled winch 80 and a cable 82. Cable 82 is connected on its one end to the winch means 80 and on its other (second) end to the lower end of the central arm 26 of structure 25.

Thus, when at its launching mode (see FIG. 2), cable 82 is windable to be quickly wound on winch 80 in a manner that accelerates and turns the lower end of the central arm 26 of structure 25 (in the direction of the arrow numbered 59), and in the landing mode (see FIGS. 1 and 3)—cable 82 brakes the movement of the central arm 26 of structure 25 (in the direction of the arrow numbered 61).

Any experienced professional would understand that winch means 80 might be driven by action of an electrical motor (engine), pneumatic or hydraulic power or even by a spring loaded mechanism.

Any experienced professional would understand as well that cable 82 might be of a type such as is used, for example, for pulling cases, or climbing (snap line rope) or any other type of cable (for example, a strap).

Any professional experienced in this field would understand that in addition, or alternatively, a system as in accordance with the present invention, might include a springy means (that is not illustrated), that is integrated with an axis means 45 designed for propelling structure 25 for the launching mode—while also serving as well to damp the motion of the structure when the system is in its (UAV) landing mode. This might be achieved, for example, by a springy means of a type of a leaves springs array that are cocked (sprung) for a launching or during a landing stage.

Any experienced professional would understand as well that axis means 45 might be formed at the bottom end of central arm 26 (of structure 25) in such a configuration so that propelling (rotating) the structure around the axis would be materialized by the controlled pulling and braking means 55 of an other selected means (e.g., direct drive on the axis, or—as said—by an array of leaf springs).

As can be seen in FIGS. 1 to 3, system 10 includes in addition, a balancing means 90 that is installed at the lower end of the central arm 26 of structure 25.

Any experienced professional would understand that means 90 enables—at the instances that the system is not found neither at its launching mode (see FIG. 2), nor at its landing enabling mode (see FIGS. 1 and 3), manual balancing of structure 25. This balancing is a manner such that it enables to reduce the height dimensions of the system and provides easy access to it as required for installing assembly 35 when anticipating a landing of a UAV or the dismounting of the UAV from the system after it has landed, or for installing carriage means 235 and installing the UAV on it, for its launching.

As can be seen in FIGS. 1 to 3, base means 50 includes a stage 51. Any professional experienced in this field would understand that stage 50 enables to stabilize the system (for example—by an array of servo motors and appropriate control function), thus stabilizing the stage relative to the movements of platform 20 on which it is installed, at least in one degree of freedom. Thus for example, by connecting to the acceleration and the tilting gauges of the vessels fire control (not shown), stage 51 can stabilize the system relative to the movements of the vessel in three axis, namely roll, pitch and yaw, while thus imparting UAV's launching and landing capability even in a relatively stormy sea.

Any experienced professional would understand that in a different configuration (that is not illustrated), it is possible to stabilize a system in accordance with the present invention in two degrees of freedom—namely yaw and pitch, while exploiting one degree of freedom that in any case exists in the system (i.e., of axis means 45) and adding one degree of freedom to the system, for example as by positioning vertical support 53 of base means 50 over an axis having a controlled movable drive in a plane that is in opposition to the movement plane around axial means 45 (while, at the same time, imparting controlled propelling capability also to axial means 45).

Additionally, as it is also possible to be observed by studying FIGS. 1 and 3—in the landing mode, system 10 includes in addition, a homing means 95 serving to pilot the approaching UAV towards the elastic means 30 that is installed in assembly 35.

In the illustrated example, homing means 95 includes an aerial 96. The aerial is installable opposite (facing) gap 37 found between arms 39 and 41 of the assembly 35.

Any experienced professional would understand that homing means 95 might be based on introducing a radio beacon or any other radiating means (for example, a laser beam), one camera or more, a thermal observation means, a GPS receiver and the like, namely any other active or passive means serving this purpose and which have already been used in the past in the field.

Similarly, any experienced professional would also understand that the homing means might be easily disassembled or folded, in a manner that it reduces the system dimensions when it is not in operation.

Note that in the UAV landing mode, a stretchable elastic means 30 is installed in assembly 35 of system 10. In the illustrated example, this elastic means 30 constitutes arresting cable 31. This cable might be of a type such as is used, for example, in rescue cases, or climbing (snap-on line) or any other type of cable (for example, a strap or the like). But any experienced professional would understand that this elastic means might also be of a totally different type, such as, for example, a rubber strap or arresting net (with or without, an additional collecting means securing the save downloading of the UAV after its landing).

In addition, any professional experienced in this field would understand that elastic means 30 might be connected at its ends to a damping and braking means (for example, an array of pulleys immersed in a viscous liquid).

Let's refer to FIG. 4. FIG. 4 constitutes an enlarged view of the a-a area depicted in FIG. 3, in a manner that it shows the details of a hook means 470 that in the illustrated example, serves to connect UAV 15 in its landing stage, unto cable 31 of the system.

As can be observed in the figure, at the instant that system 10 is functioning at its landing mode, the dismountable connection of arresting cable 31 with UAV 15 is executed at the time of the landing mode phase, by resorting to hook device 470.

Hook device 470 is installed wherein it protrudes from the UAV while its opening 472, is essentially directed towards the flight's direction of the UAV. The hook's opening 472 is suited by its dimensions to lead arresting cable 31 into it. Opening 472 constitutes a springy lockable arrangement in the opposite direction (by its springy lock 474), in a manner such that from an instant that arresting cable 31 entered into hook device 470, it cannot be set free from it, except subject to opening and releasing of springy lock 474.

Any experienced professional would understand that hook device 470 is only presented here as an example and that in a system in accordance with the present invention, achieving the coupling of the UAV to elastic means 30 at the time it is landing, might also be accomplished by various other means. For example, The UAV might drop from it a cable with a maneuverable device at its end. During a stabile flying of the UAV at low altitude over the system, the maneuverable device might then be lead and homed towards elastic means 30. The maneuverable device might be connected to elastic means 30, for example—by a hook or by winding itself on elastic means 30, and bring about the pulling and landing of the over flying UAV.

Any experienced professional would also understand that the activity of system 10 when it is in its landing mode is based inter alia on the elastic characteristics of assembly 35. It is possible to increase the operational values of these features by various means.

Earlier in this presentation, we have already pointed out some of the possibilities at our disposal, for example integrating damping means into axis means 45 and/or with elastic means 30. One more example is presented below—

Designing arms 39 and 41 of assembly 35 (namely—the arms between which stretchable elastic means 30 is stretched), in such a manner that would include, each one of them, a sector that has an increased module of elasticity. End sectors that will be bendable upon the stretching of elastic means 30 and provide additional damping capability to the system.

Let's refer now to FIG. 5. FIG. 5 constitutes an enlarged view in perspective representation of the b-b area depicted in FIG. 3, in a manner that shows the elastic entities 539 and 541 of assembly 35.

So for example, if assembly 35 would be manufactured, as a rule, from rigid materials (from aluminum profiles or composite materials), than it would be possible to manufacture the elastics end sectors 539 and 541 from materials that has a higher elastic modulus (e.g.—flexible composite materials or rubber).

Figure 6:
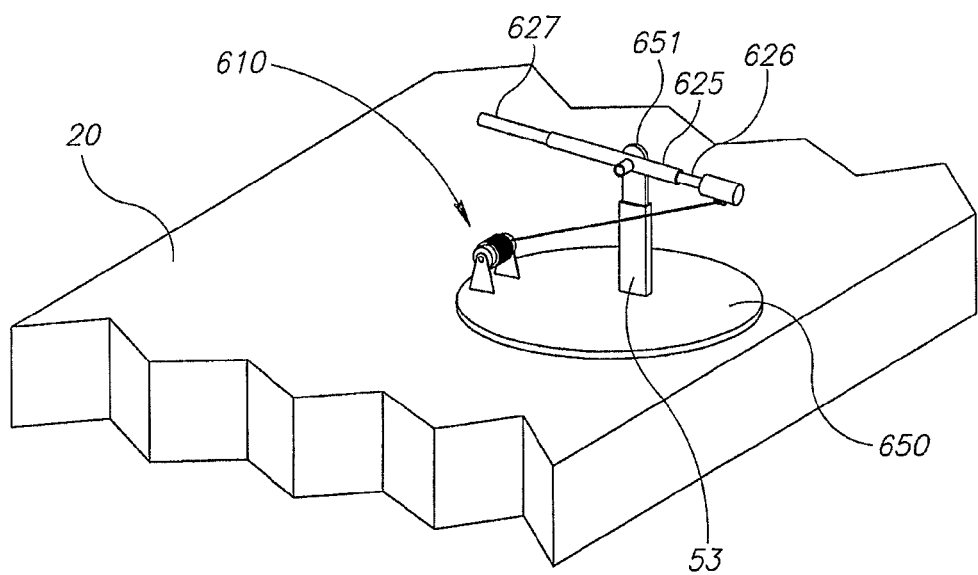
Figure 7A:
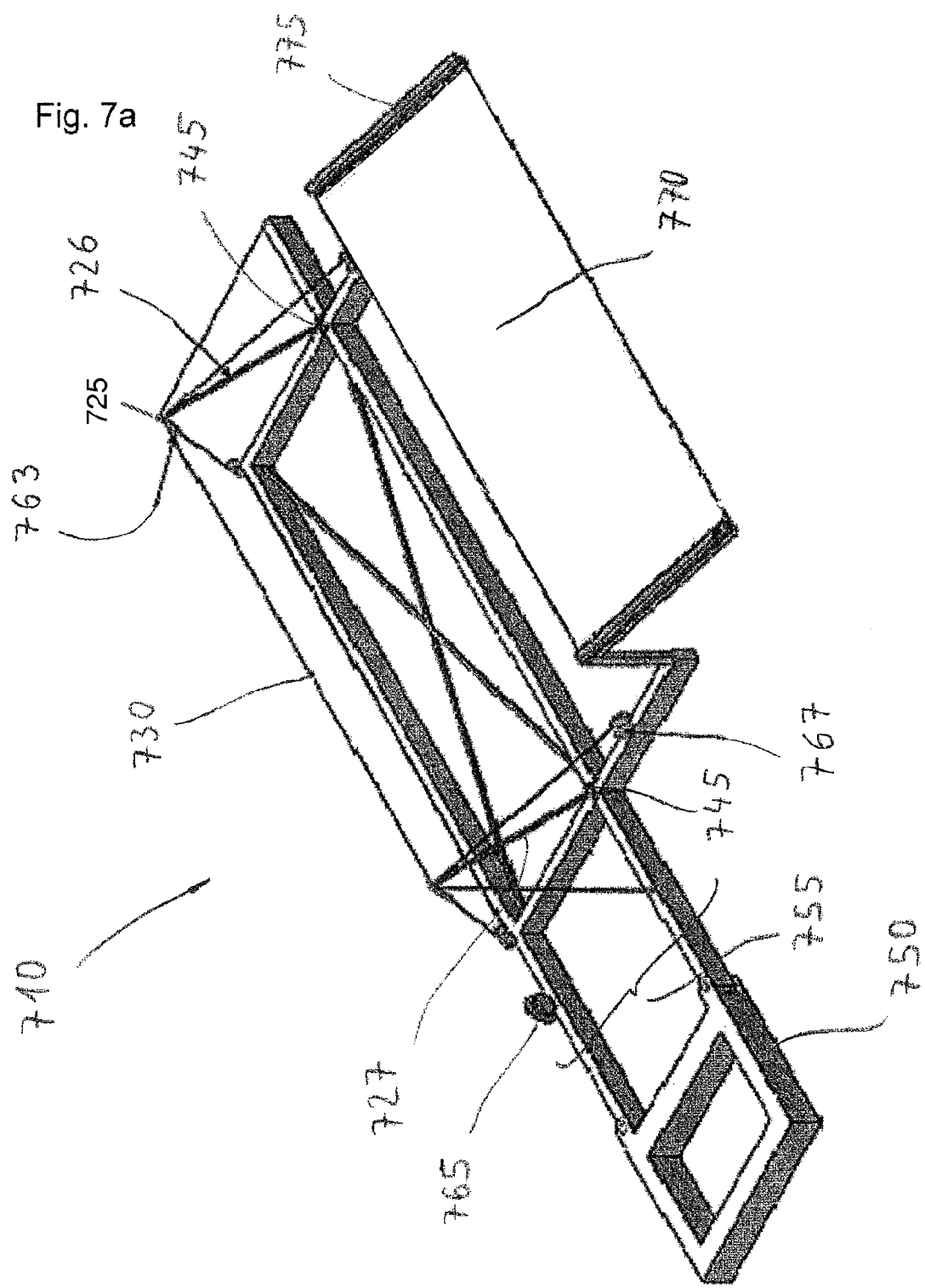
Figure 7B:
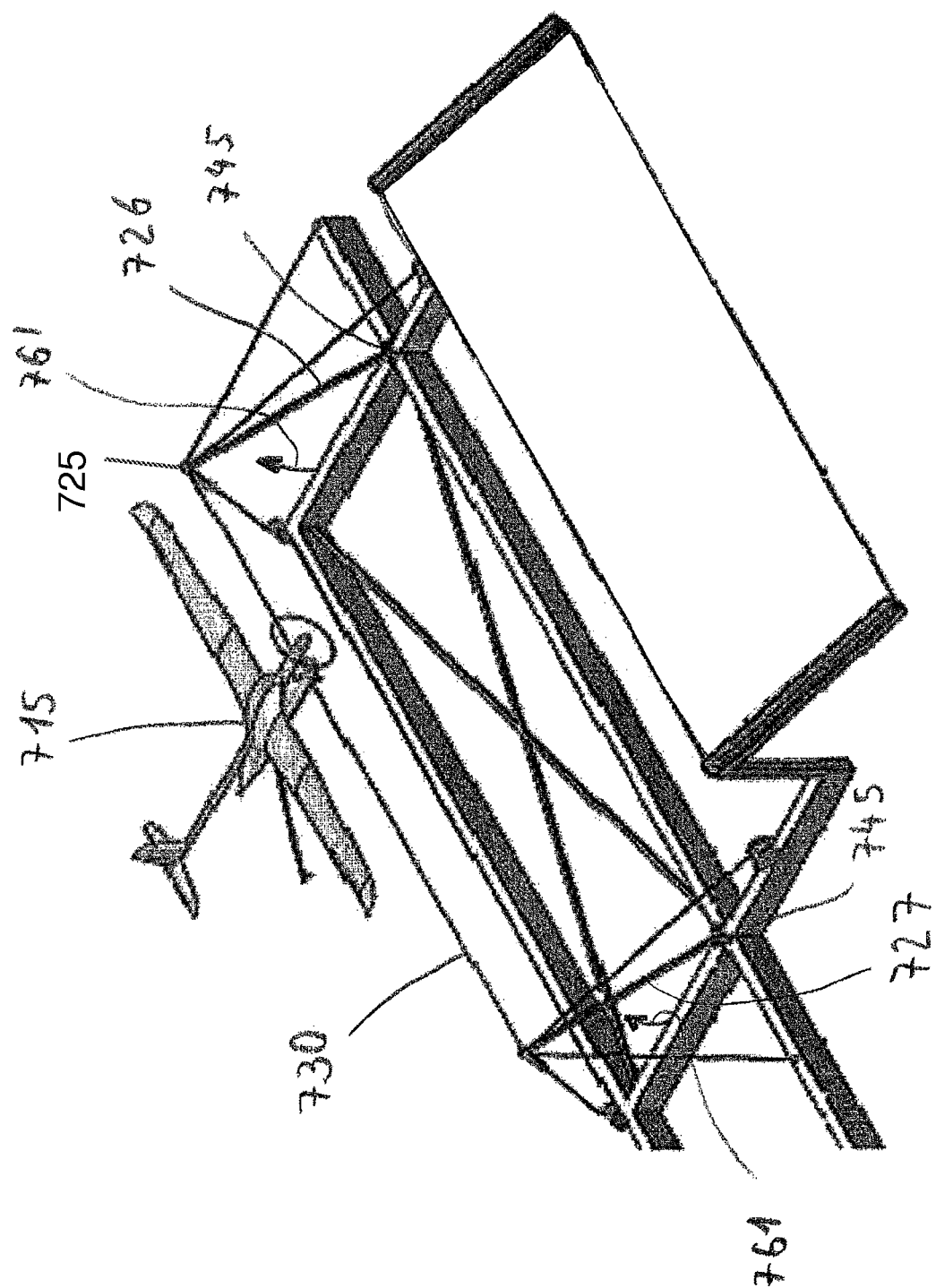
Figure 7C:
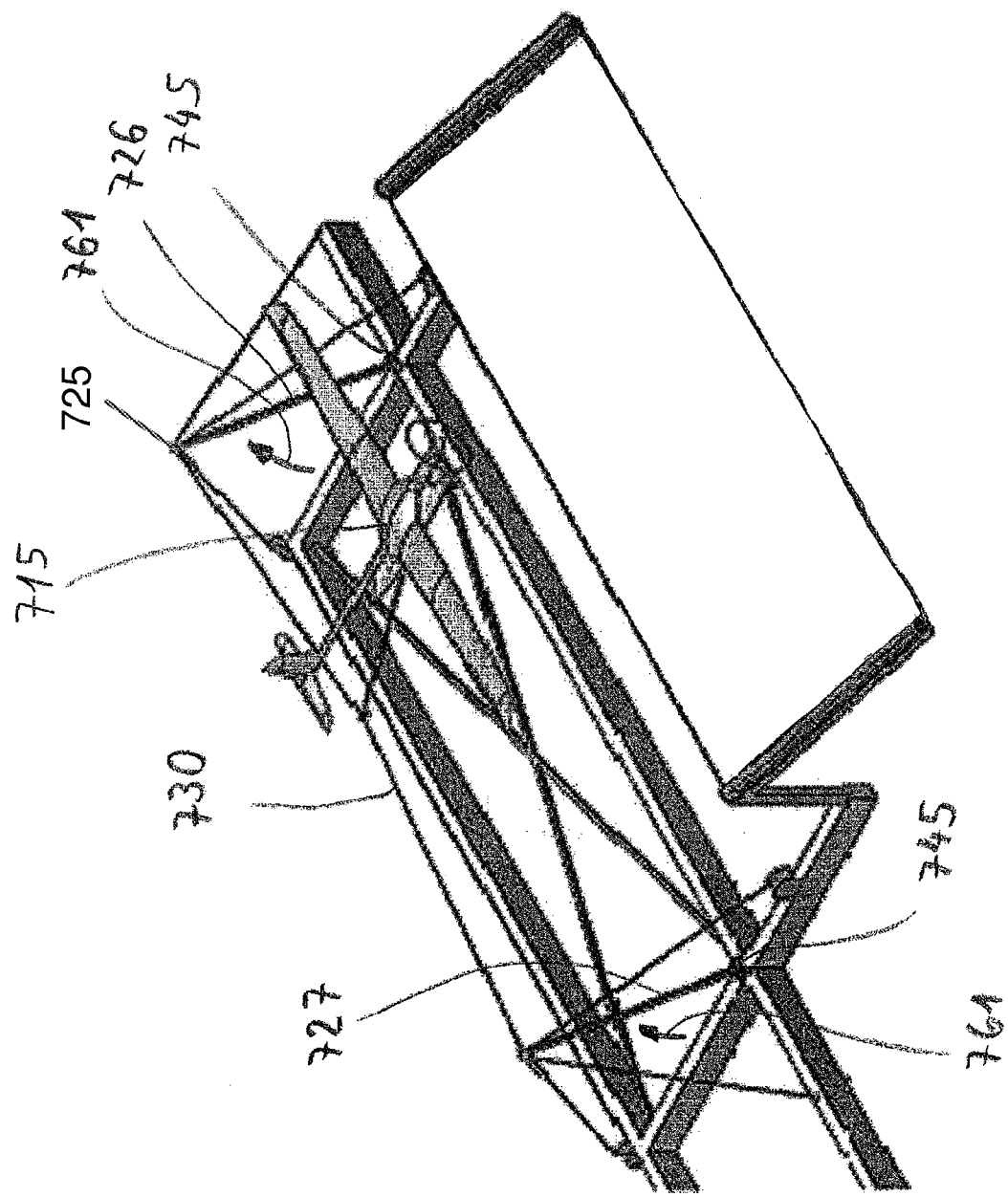
Figure 7D:
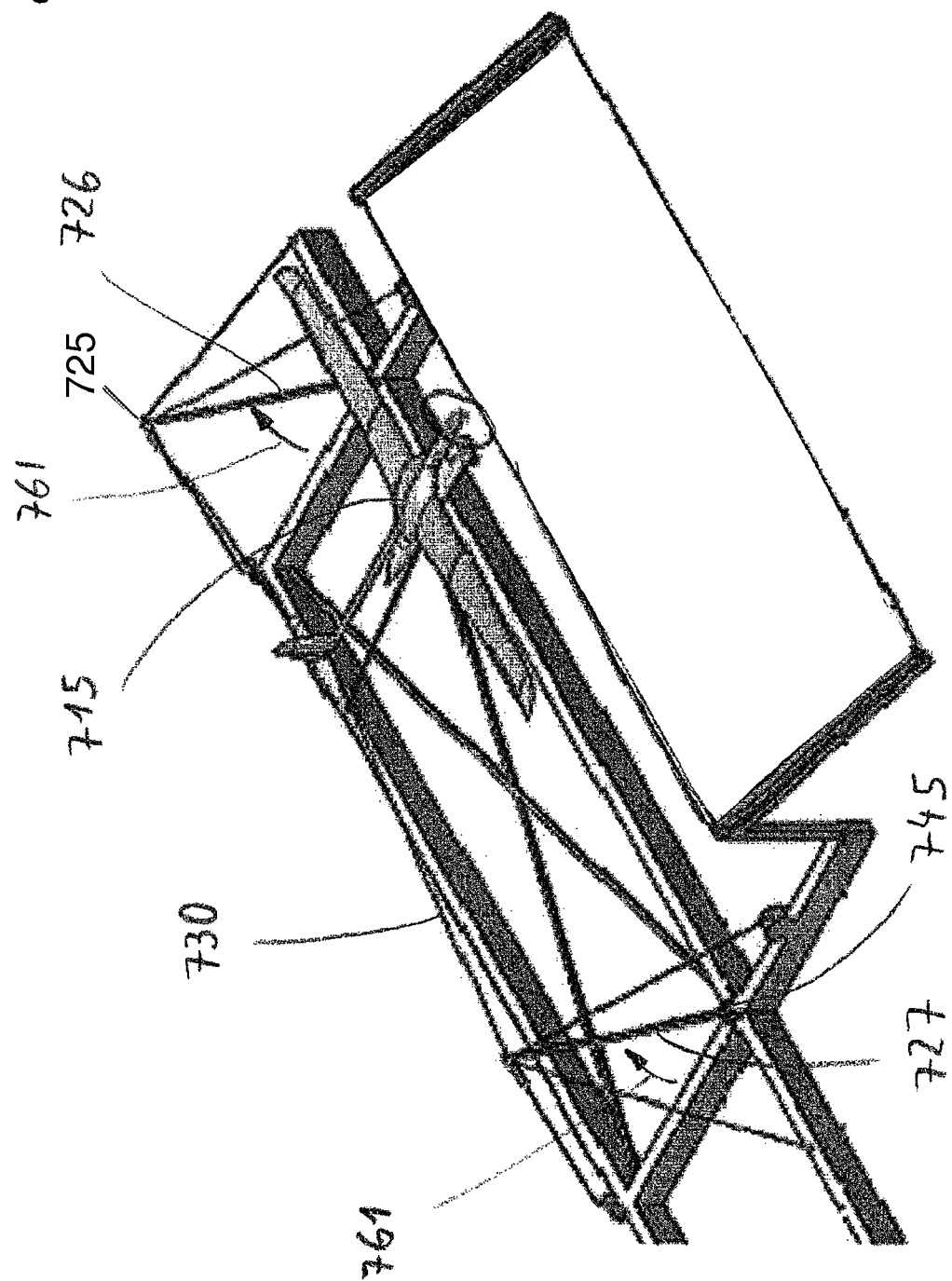
Figure 7F:
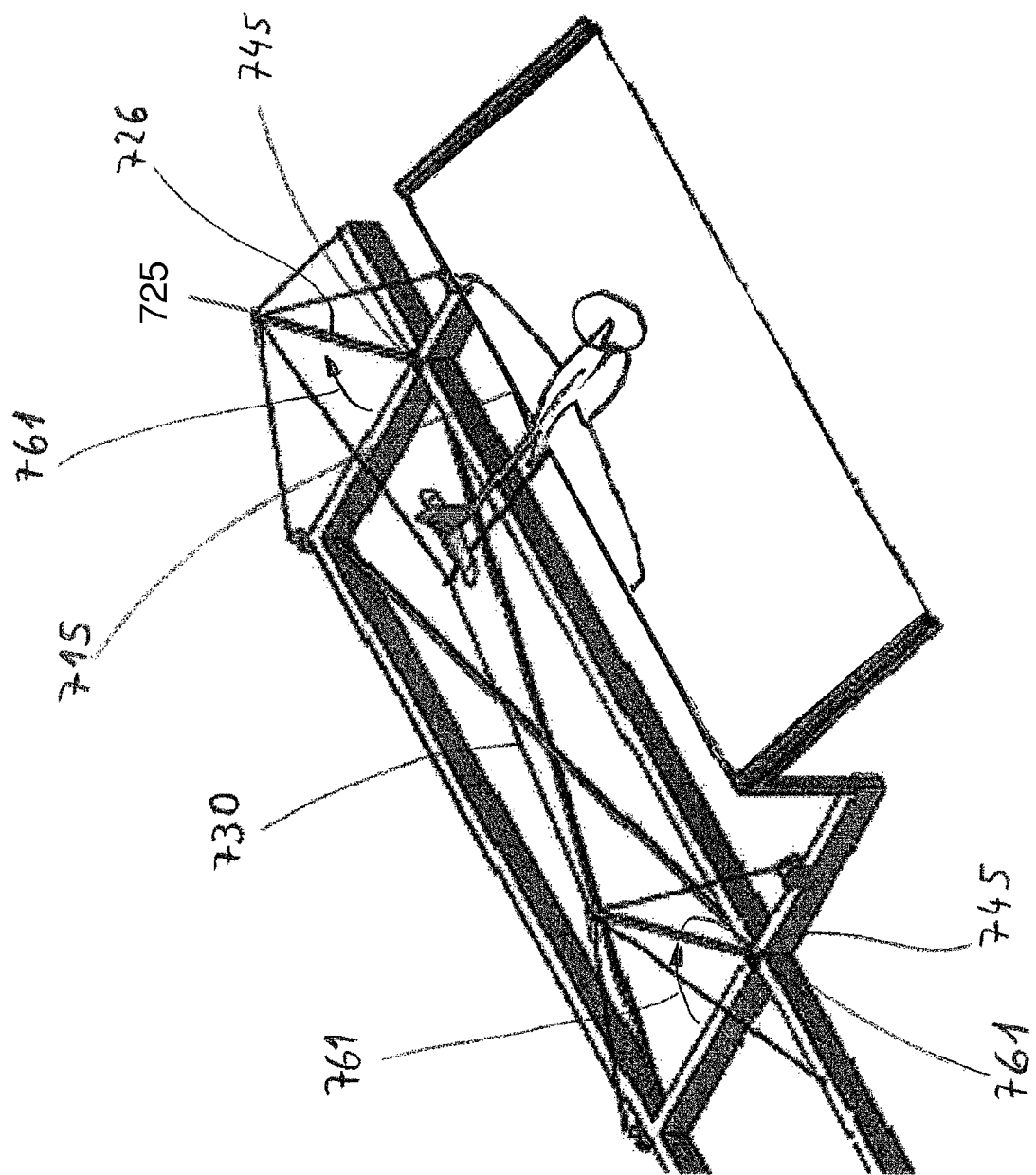
Figure 7G:
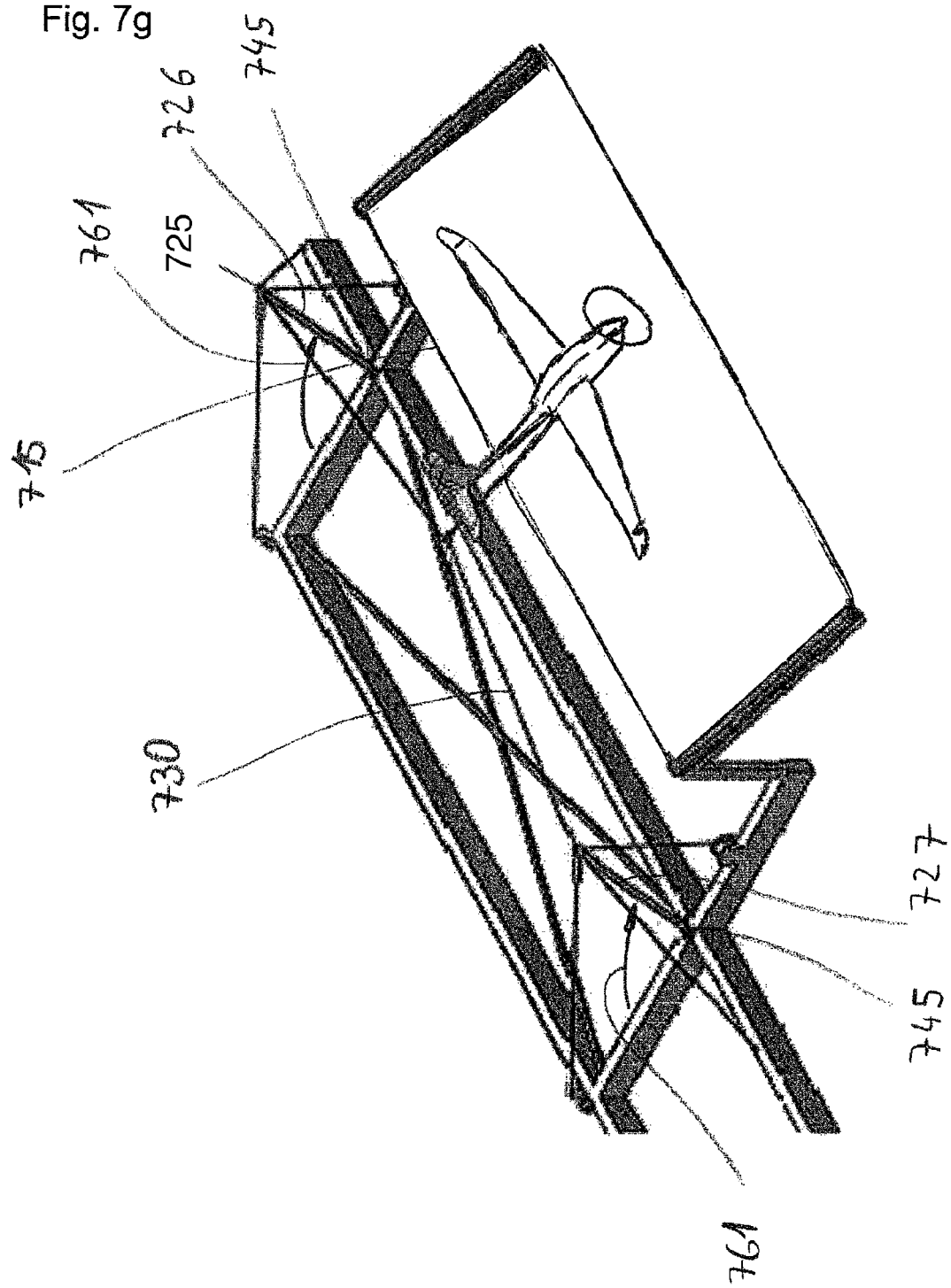

Let's refer to FIG. 6. FIG. 6 constitutes an illustration view of an additional configuration of a system 610 for launching and landing UAV's in accordance with the present invention, wherein it is shown in its stowing state (as it is folded).

System 610 demonstrates the compactness properties that the invention imparts and the relatively smaller volume that it requires for being installed on a platform (sole for the sake of illustration, the platform is depicted once more as the stern of a missiles boat 20).

Structure 625 in system 610, comprises the telescopic components 626 and 627. Similarly, base means 650 of system 610, includes as well, a telescopic component 651.

Any experienced professional would also understand that it is possible to implement such a telescopic structure in only part of the arms or also solely in the system's base means.

Any experienced professional would understand that in additionally or alternatively, it is feasible to implement a system in accordance with the invention, in a manner that it would incorporate a foldable structure. We have mentioned for example (one that is not illustrated) the possibility of stabilizing the system by installing the vertical support 53 of the base means 50, over an axis that can be subjected to a controlled drive. Any experienced professional would understand that by utilizing such a structure, it becomes feasible to fold the system into a reduced space structure for storage, while achieving a remarkable saving in storage room volume.

Naturally, any experienced professional would understand that implementing the principles of telescopic structure in the system and/or folding of the structure, enables to reduce the dimensions of the whole structure when the system is not found in either of the operating modes—neither launching nor landing. By this approach, saving in area efficiency is gained on the relatively small platform and the interference caused by installing the system there is also diminished. In addition, and at combat times more important, is the reduction in the values of the platform's signature—exposure to detection and firing entities.

Let's refer to FIGS. 7a to 7g. FIGS. 7a to 7g constitute illustrations of the operational sequence of yet an additional configuration of a system 710 for landing (only) of UAV (715 is shown starting in FIG. 7b), in accordance with the present invention, wherein system 710 is mainly deployable across the platform's deck (not illustrated).

In the illustrated example, system 710 is mountable across the deck of a mobile platform (such as a missile boat) or a stationary one. System 710 comprises a structure assembly 725 that constitutes a sort of a mechanical slingshot structure utilized for arresting landing UAV 715 in a rather damped restraining manner.

Assembly 725 comprises a pair of rotatable arms 726, 727, with an elastic means 730 (e.g.—arresting, or in other words—a catching cable) stretched between them as a stretchable elastic means installed in a stretched manner at the gap between the pair of arms 726, 727. Elastic means 730 is adapted for connecting unto UAV 715 in the course of its landing (see FIGS. 7b to 7g).

System 710 comprises, in addition to all the above, also an axis means 745 that is installed at one end of each of the pair of rotatable arms 726, 727 and enables the arms movement around it.

Base means 750 connects axis means 745 to the platform at which system 710 is installed. In the illustrated example, the system is installed across the deck of a platform (not illustrated), and as said, any professional in this field would understand that the system might be installed on variety of platforms (for example, a ship, a vehicle, a train, a roof of a building or a (surveillance) post).

Means 755 for controlled pulling and braking connects between the other (second) ends of each of the pair of rotatable arms 726, 727 to base means 750 through an array of cables 763, brake system 765 and drum system 767 equipped with a ratchet.

Any professional will understand that means 755 brakes the movement of the pair of rotatable arms 726, 727. Arms 726, 727 are propelled (driven) to rotational movement around axis means 745, from the instant that UAV 715 (the one that is to land) connects with elastic means 730. This contact drives rotatable arms 726, 727 to their rotational movements, as said, around axis means 745 (see FIG. No. 7a to No. 7g).

Any experienced professional would understand that the landing mode operation of system 710 is based, inter alia, on braking and damping the movement of rotatable arms 726, 727, from the time, as said, that UAV 715 connects with elastic means 730. This connection drives the rotatable arms 726, 727—as said, to a rotational movement around axis means 745 (in the direction of the arrow numbered 761)

Thus, a system in accordance with the invention includes in its braking and damping means—cables 763, brake system 765 and drum system 767 that is equipped with a ratchet that is integrative with axis means 745 in such a manner that when at the landing mode—this means brakes and damps the movement of rotatable arms 726, 727 around the axis means 745. Such a braking and damping means might be based, for example, also on additional braking means such as—a viscous damper, mechanical brake, electrical motor.

Thus, upon the landing of UAV 715, the cable 763 breaks the movement of rotatable arms 726, 727 (in the direction of the arrow numbered 761).

Any experienced professional would understand that brake system 765 and drum system 767 might perform additional braking power by action of an electrical motor (engine), pneumatic or hydraulic power or even by a spring loaded mechanism.

Any experienced professional would understand as well that cable 763 might be either a steel cable or a cable of a type such as is used, for example, for pulling cases, or climbing (snap line rope) or any other type of cable (for example, a strap).

System 710 may also includes a cushion means 770, positioned across—and substantially in parallel to—elastic means 730. Such cushion means may be selected from a known group consisting of—cloth (e.g.—tarpaulin), inflatable air bag, flexible board, a pad or a net.

As depicted in FIG. No. 7f and FIG. No. 7g, cushion means 770, may serves as the final arresting means for the landing UAV 715, Let's refer to FIGS. 8a and 8b. FIGS. 8a and 8b constitute an illustration of a yet additional configuration of a system 810 for landing (only) of UAV in accordance with the present invention, wherein system 810 is depicted in its deployable position across the platform's deck 820 (FIG. 8a) and folded for stowage position (FIG. 8b).

Same as in system 710 (illustrated in FIGS. 7a to 7g), system 810 similarly is braking and damping the landing UAV 815, while utilizing for this purpose a slingshot type of structure (based on an array of cables, a brake system and a drum system).

Any professional will appreciate the deployability of system 810 across deck 820 by a single arm manipulator 881, as illustrated.

Finally, Reference is being made to FIGS. 9a and 9b. FIGS. 9a and 9b constitute an illustration of yet an additional configuration of a system 910 for landing (only) of UAV in accordance with the present invention, wherein the system is depicted in its deployable position across the platform's deck 920 (FIG. 9a) and folded for storage position (FIG. 9b).

As in system 710 illustrated in FIGS. 7a to 7g, and system 810 illustrated in FIGS. 8a and 8b, system 910 too, is shown braking and damping the landing UAV (not shown), while utilizing for this purpose a slingshot type of structure (based on an array of cables, a brake system and a drum system).

Any professional will appreciate the deployability of system 910 across the deck 820 by rotating it around a single axis 983 as illustrated.

Any professional will appreciate that enabling the relative movement of the slingshot structure upon the lending of the UAV, is a characteristic feature of the invention (in direct contradiction to rather stiff pillars with a catching cable starched between them).

For example—The rotatable arms 726, 727 as depicted in the preferred embodiment as shown in FIGS. 7a to 7g, are not subject to a bending moment upon landing of the UAV as they can rotate freely about axis means 745. This enables the design of the slingshot structure with a relatively low module of inertia (e.g.—in the form of rather slim arms 726, 727 as shown in FIGS. 7a to 7g), and therefore, directing the energy of the UAV (715) that must be absorbed during the landing unto the system's means 755 for controlled pulling and braking (e.g.—array of cables 763, brake system 765 and drum system 767 equipped with a ratchet as shown in FIG. No. 7a to No. 7g).

In the description that has been presented solely as an example depicting preferred embodiments of the invention, we did not detail the mechanical components that were used in the system, because any professional in this field would know to design and manufacture them in accordance with the accompanying figures above (for example, the method of connecting the elastic means to the arms of the carriage means or the assembly to the structure and so on).

Thus, a UAV's launching and landing system in accordance with the present invention that was described above while referring to the accompanying figures, imparts distinguishable and unmistakably clear advantages of compactness and reduced dimensions, and hence a UAV's launching and landing systems in accordance with the present invention is installable on relatively small mobile platforms (such as missiles boats), combined with and integrative with the detection and warfare systems found on such platforms, and reducing interference to their operation and capabilities. In addition, UAV's launching and landing systems in accordance with the present invention is also simple and easy to maintain and operate and imparts capability of launching and landing the UAV's at a high rate combined with high reliability and safety.

Any professional would understand that the present invention was described above only in a way of presenting examples, serving our descriptive needs and those changes or variants in the structure of the system for launching and landing of UAV—the subject matter of the present invention, would not exclude them from the framework of the invention.

In other words, it is feasible to implement the invention as it was described above while referring to the accompanying figures, also with introducing changes and additions that would not depart from the constructional characteristics of the invention, characteristics that are claimed herein under.

The invention claimed is:

1. A system for landing UAVs, comprising:
a slingshot structure having a pair of rotatable arms with a first end and a second end;
a rotatable joint installed at the first end of each of said pair of rotatable arms of said slingshot structure and wherein said pair of rotatable arms are configured to move around said rotatable joint;
a movable base connecting said rotatable joint to a platform at which said system is installable;
a controlled pulling and braking means that connects between lower end of said pair of rotatable arms of said slingshot structure and said platform upon which said system is installable; and
an arresting cable installed in a stretched manner at a gap between said rotatable pair of arms and set to receive a landing UAV, wherein
at a landing phase, said controlled pulling and braking means brakes the motion of said rotatable pair of arms of said slingshot structure that is propelled to revolve around said system's rotatable joint, from a time that said landing UAV forms contact with said arresting cable and propels said structure to move around said rotatable joint.

2. A system for landing UAVs, in accordance with claim 1, wherein said platform is a vessel deck and said slingshot structure is deployable across the vessel deck.

3. A system for landing UAVs, in accordance with claim 1, wherein said system comprises in addition:
a cushion means for receiving the landing UAV.

* * * * *